United States Patent [19]
Imada et al.

[11] Patent Number: 6,143,687
[45] Date of Patent: Nov. 7, 2000

[54] DENITRATION CATALYST, PROCESS FOR PREPARING THE SAME, AND EXHAUST GAS PURIFICATION METHOD

[75] Inventors: Naomi Imada; Yasuyoshi Kato, both of Kure, Japan

[73] Assignee: Babcock-Hitachi Kabushiki Kaisha, Tokyo, Japan

[21] Appl. No.: 09/254,376
[22] PCT Filed: Jul. 9, 1998
[86] PCT No.: PCT/JP98/03083
 § 371 Date: Apr. 2, 1999
 § 102(e) Date: Apr. 2, 1999
[87] PCT Pub. No.: WO99/02262
 PCT Pub. Date: Jan. 21, 1999

[30] Foreign Application Priority Data

Jul. 9, 1997 [JP] Japan ................................. 9-183691

[51] Int. Cl.[7] .............................. B01J 31/00; B01J 23/00; C01B 21/00
[52] U.S. Cl. ...................... 502/159; 423/235; 423/239.1; 502/150; 502/305; 502/311; 502/312; 502/321; 502/507
[58] Field of Search ...................... 502/150, 151, 502/159, 507, 305, 311, 312, 321; 423/235, 239.1; 427/220, 221, 419.5, 407

[56] References Cited

FOREIGN PATENT DOCUMENTS 2095938  11/1993  Canada .

Primary Examiner—Steven P. Griffin
Assistant Examiner—Maribel Medina
Attorney, Agent, or Firm—Fay, Sharpe, Fagan, Minnich & McKee, LLP

[57] ABSTRACT

A denitration catalyst for use in the reduction of nitrogen oxides contained in an exhaust gas containing highly deliquescent salts as dust with ammonia, which bears thereon a porous coating of a water-repellent organic resin, a porous coating of a mixture of a water-repellent organic resin with inorganic oxide particles, or a porous coating of a mixture of a water-repellent organic resin with catalyst component particles. The denitration catalyst can be prepared, for example, by coating the surface of a denitration catalyst with an aqueous dispersion containing a water-repellent organic resin having a lower concentration, drying the coating, further coating the dried coating with an aqueous dispersion containing a water-repellent organic resin having a higher concentration, and then drying the coating to form a porous coating of a water-repellent organic resin. This denitration catalyst, even when used in the treatment of an exhaust gas containing ash containing highly deliquescent salts, enables the water-repellent porous coating formed on the surface to prevent the salts that have deliquesced from entering the catalyst. This can prevent the deterioration of the catalyst and enables a high catalytic activity to be maintained for a long period of time.

18 Claims, 3 Drawing Sheets

Time Elapsed

DENITRATION CATALYST, PROCESS FOR PREPARING THE SAME, AND EXHAUST GAS PURIFICATION METHOD

TECHNICAL FIELD

The present invention relates to a denitration catalyst, a process for preparing the same, and an exhaust gas purification method, and in particular to a denitration catalyst for efficient catalytic reduction, with ammonia ($NH_3$), of nitrogen oxides (NOx) contained in an exhaust gas containing highly deliquescent salts as dust, such as in an oil-fired boiler exhaust gas, a combustion exhaust gas from wood waste, wood as fuels, and in a furnace for refuse.

BACKGROUND ART

NOx in flue gas discharged from a power station or an incinerator is a substance causing photochemical smog and acid rain, and a flue gas denitration method by selective catalytic reduction with ammonia as a reducing agent is used widely as a method for effective removal of NOx mainly in thermal power stations. As the catalyst, a titanium oxide ($TiO_2$) type catalyst containing vanadium (V), molybdenum (Mo) or tungsten (W) as the active component is used, and particularly the catalyst containing vanadium as one of the active components is highly reactive and can be used at low temperatures (e.g. in a temperature range of 300° C. or less), so it becomes the mainstream of the denitration catalyst at present (Japanese Patent Application Laid-Open No. 50-128681A and the like).

The catalyst in the prior art mentioned above has superior characteristics by which very high degrees of denitration can be achieved in purification of combustion exhaust gases such as gas-fired, oil-fired or coal-fired fuel exhaust gases, but no adequate measures have been taken to purify an exhaust gas from wood waste and wood as fuels abundant in North Europe or the like area and an exhaust gas containing a large amount of deliquescent salts in ash from an incinerator and the like, and there has been the problem that the degrees of denitration are lowered with time.

Figure 7:
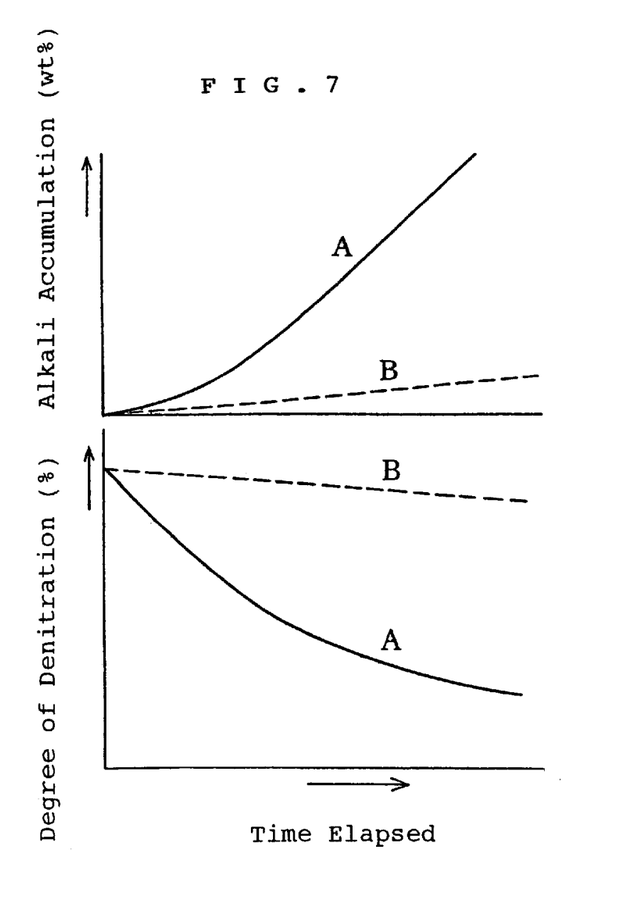
FIG. 7 is a drawing showing the problem of the conventional catalyst.

FIG. 7 shows the degrees of denitration and the change of the amount of an alkali accumulated in the conventional denitration catalyst in the case (A) where the conventional catalyst was exposed to a wood-fired boiler combustion exhaust gas as an example of application to an exhaust gas containing a large amount of deliquescent salts and the case (B) where the catalyst was exposed to a coal-fired boiler exhaust gas as an example not containing deliquescent salts. In the case (A) of the wood-fired boiler containing a large amount of potassium carbonate as a deliquescent alkali metal salt, there occurs the phenomenon in which the amount of the alkali in the catalyst is increased and the degree of denitration rapidly decreases.

Such deterioration of the denitration catalyst by the alkali metal salt also occurs where an incinerator exhaust gas or a high-sulfur oil-fired boiler exhaust gas is to be denitrated, thus greatly preventing practical application of the low-temperature denitration method to such exhaust gases.

It was found that the above deterioration by the highly deliquescent salt is caused by inclusion, in ash, of (1) potassium carbonate in the case where wood waste is used as the fuel, (2) calcium chloride or sodium chloride in the case of refuse combustion exhaust gas, and (3) sodium sulfate and potassium sulfate in the case of high-sulfur oil-fired boilers. Accordingly, it is believed that although the alkali metal salts in ash differ depending on the type of exhaust gas as described above, any deterioration of the catalyst during low-temperature denitration is caused by the common mechanism in which the alkali metals and alkaline earth metal salts contained in ash absorb moisture to deliquesce to form a liquid in the step of temperature raising when a denitration apparatus starts or stops, so that the fluid of the metal salts penetrates into the catalyst to cause the clogging of pores therein and to deteriorate the active site.

To prevent the deterioration of the denitration catalyst by such fluid having deliquesced, it is necessary to physically prevent the fluid that has deliquesced from entering the denitration catalyst.

The present invention provides a highly durable denitration catalyst which is prevented from undergoing rapid deterioration upon deliquescence of salts, which deterioration occurs in the case of denitration of an exhaust gas containing ash having a wide variety of deliquescent salts as described above, a process for preparing the the denitration catalyst, and a method for purification of an exhaust gas by use of the same.

DISCLOSURE OF THE INVENTION

The inventions claimed in this patent application are as follows:

(1) A denitration catalyst for use in the reduction, with ammonia, of nitrogen oxides contained in an exhaust gas containing highly deliquescent salts as dust, which bears on the surface of the denitration catalyst a porous coating layer of a water-repellent organic resin, a porous coating layer of a mixtures of a water-repellent organic resin with inorganic oxide particles, or a porous coating layer of a mixture of a water-repellent organic resin with catalyst component particles.

(2) A denitration catalyst according to (1), wherein the water-repellent organic resin comprises at least one of fluorine resin, polyamide resin, acrylic resin and silicon resin.

(3) A denitration catalyst according to (1) or (2), wherein the catalyst component particles consist of titanium oxide, molybdenum oxide or tungsten oxide and vanadium oxide.

(4) A denitration catalyst according to any one of (1) to (3), wherein the denitration catalyst is a catalyst molded body containing titanium oxide, molybdenum oxide or tungsten oxide, and vanadium oxide.

(5) A denitration catalyst according to any one of (1) to (3), wherein the denitration catalyst is a plate-shaped molded body comprising a composition mainly composed of titanium oxide and molybdenum oxide or tungsten oxide, and vanadium oxide, filled between network inorganic fiber substrates and within the nets thereof.

(6) A process for preparing a denitration catalyst, which comprises permitting an aqueous slurry or emulsion of at least one resin composition selected from the group consisting of a water-repellent organic resin, a mixture of the water-repellent organic resin and inorganic oxide particles, and a mixture of the water-repellent organic resin and catalyst component particles to be coated on, or to adhere by a spray to the surface of a denitration catalyst and then evaporating its water to form their porous coating layer.

(7) A process for preparing a denitration catalyst according to (6), wherein the denitration catalyst is a catalyst molded body containing titanium oxide and molybdenum oxide or tungsten oxide, and vanadium oxide, and the catalyst molded body is previously moistened to form the porous coating layer in a wet state.

(8) A process for preparing a denitration catalyst, which comprises coating an aqueous dispersion containing a water-repellent organic resin at a low concentration onto the surface of a denitration catalyst for use in the ammonia reduction of nitrogen oxides contained in an exhaust gas containing highly deliquescent salts as dust, drying the coating, further coating the dried coating with an aqueous dispersion containing a water-repellent organic resin at a higher concentration than the above concentration, and then drying the coating to form a porous coating layer of the water-repellent organic resin.

(9) A process for preparing a denitration catalyst according to (8), wherein the concentration of the water-repellent organic resin in the low-concentration aqueous dispersion ranges from 5 to 30% by weight.

(10) A process for preparing a denitration catalyst according to (8), wherein the concentration of the water-repellent organic resin in the low-concentration aqueous dispersion ranges from 10 to 20% by weight.

(11) A process for preparing a denitration catalyst according to (8), wherein the concentration of the water-repellent organic resin in the high-concentration aqueous dispersion ranges from 30 to 60% by weight.

(12) A process for preparing a denitration catalyst according to any one of (8) to (11), wherein the water-repellent organic resin comprises at least one of fluorine resin, polyamide resin, acrylic resin and silicon resin.

(13) A process for preparing a denitration catalyst according to any one of (8) to (12), wherein the denitration catalyst is a catalyst molded body containing titanium oxide molybdenum oxide or tungsten oxide and vanadium oxide.

(14) A denitration catalyst according to any one of (8) to (12), wherein the denitration catalyst is a plate-shaped molded body comprising a composition mainly composed of titanium oxide and molybdenum oxide or tungsten oxide, and vanadium oxide, having filled between network inorganic fiber substrates and within the nets thereof.

(15) A denitration catalyst prepared by a process according to any one of (8) to (14).

(16) A method for purification of an exhaust gas, which comprises reduction, with ammonia, of nitrogen oxides contained in an exhaust gas containing highly deliquescent salts as dust by use of a denitration catalyst according to any one of (1) to (15).

BRIEF DESCRIPTION OF THE DRAWINGS

In the drawings, 1 means the denitration catalyst component layer; 2, a water-repellent coating layer; 3, an alkali that has deliquesced; 4, denitration catalyst particles; 10, the denitration catalyst; 11, the surface of the catalyst; 12 and 12a, cracks; 13, 13a, 14 and 14a, coating layers; and 16, 16a, 17 and 18, penetration layers.

BEST MODE FOR CARRYING OUT THE INVENTION

Hereinafter, the present invention is described in detail by reference to the drawings.

Figure 1:
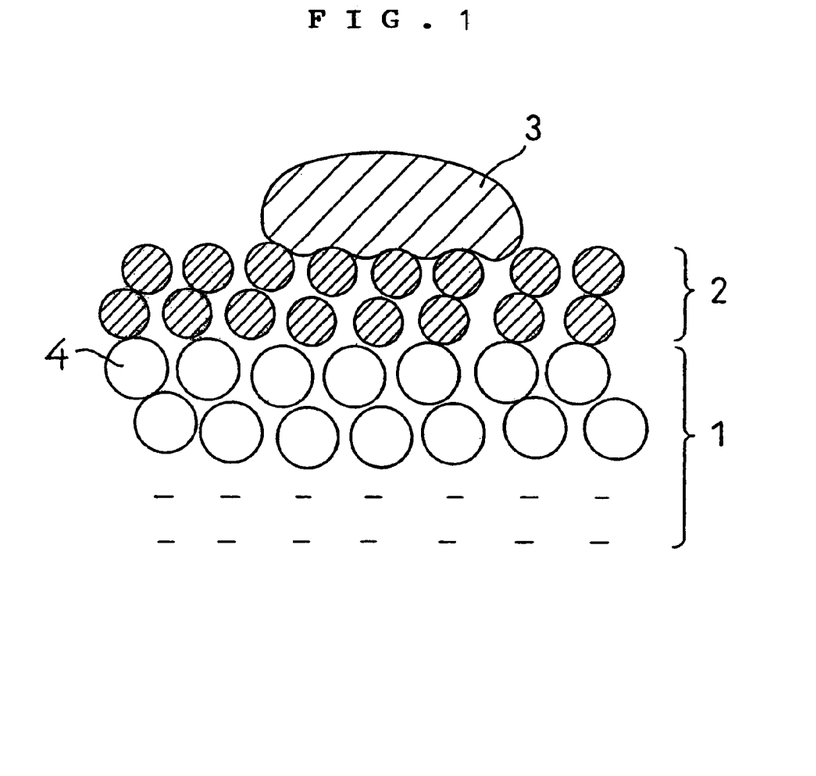
FIG. 1 is a drawing showing the working effect of the denitration catalyst of the present invention.
Figure 2:
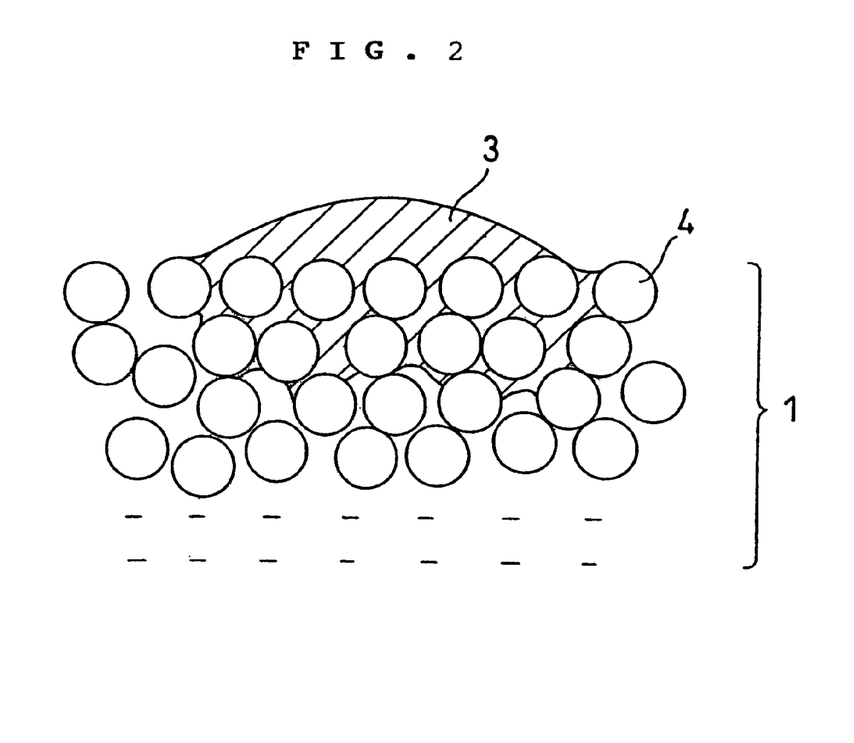
FIG. 2 is a drawing showing the working effect of a conventional catalyst.

FIG. 1 is a drawing showing the working effect of the denitration catalyst of the present invention, and FIG. 2 is a drawing showing the working effect of a conventional catalyst.

In FIG. 1, the denitration catalyst of the present invention bears, on the surface of the denitration catalyst component layer 1 consisting of the denitration catalyst particles 4, the water-repellent coating 2 selected from a porous coating layer of a water-repellent organic resin, a porous coating layer of a mixture of a water-repellent organic resin with inorganic oxide particles, or a porous coating layer of a mixture of a water-repellent organic resin with catalyst component particles.

In general, when the denitration catalyst is used in an exhaust gas containing highly deliquescent alkali metal salts, dust adheres as particles to the surface of the catalyst.

The alkali metal salts adhered to the catalyst absorb moisture in the atmosphere or exhaust gas to deliquesce and enter the catalyst when the apparatus stops or starts. When the alkali salts adhered to the surface of the denitration catalyst component layer 1 deliquesce, alkali 3 deliquesced penetrates through the spaces among the denitration catalyst particles 4 into the inside of the catalyst as shown in FIG. 2, thus causing the clogging of pores and simultaneously reacting with the catalyst component to denature the active site and to deteriorate the catalyst. By way of example, the conventional catalyst is embedded in potassium carbonate, and after maintained for one day under high humidity, the catalyst was observed for the outer appearance, and as a result it was found that the potassium carbonate deliquesced and adhered to the surface of the catalyst after the test. The catalyst was dried, the salt deliquesced was removed therefrom, and the amount of potassium in the catalyst was determined. The result indicated that the potassium accounted for several tens % by weight, and it was thus found that the potassium carbonate entered the inside of the catalyst.

When the conventional catalyst is used in an exhaust gas containing deliquescent salts as dust, the dust having adhered thereto deliquesces with water when the denitration apparatus stops or starts again, and the fluid of the dust transfers into the catalyst to cause the reduction of the activity of the catalyst.

To the contrary, the denitration catalyst according to the present invention bears the water-repellent coating layer 2 on the surface of the denitration catalyst component layer 1, and this water-repellent coating layer 2 has a large contact angle to water, salts, so even if the alkali 3 deliquesced becomes fluid to adhere to the surface of the catalyst, it is repelled as shown in FIG. 1. Further, because of its surface tension, the deliquescent substance cannot penetrate into the inside of the catalyst so it does not cause clogging of pores or deterioration of the catalyst resulting from denaturation of the active site. Further, the water-repellent coating 2 is porous, repels fluid because of its surface tension, but can pass gases such as reactive gas, vapor through it, so it does not prevent the denitration reaction.

On the other hand, the high water-repellent effect of the surface of the catalyst is achieved by forming a water-repellent coating layer having a sufficient thickness on the surface of the catalyst, but if the coating layer is too thick, the water-repellent effect is raised, but the diffusion of an exhaust gas into the catalyst is prevented, so the denitration performance of the catalyst is easily lowered, and further a large amount of the water-repellent component coated leads to higher costs. Accordingly, it is preferable to reduce the amount of the water-repellent component coated on the surface of the denitration catalyst. Further, if the surface of the catalyst has a site where a coating layer of the water-repellent component is not formed, the fluid of the alkali deliquesced penetrates through such sites to cause the deterioration of the catalyst, so it is preferable to form a thin and dense coating.

If a dispersion of a high-concentration water-repellent component is used to form the water-repellent coating layer on the surface of the catalyst, a thin and uniform water-repellent coating cannot be applied on the surface of the catalyst. Further, if a low-concentration dispersion is used, there occurs a site where a water-repellent coating layer is not formed on the surface of the catalyst and this site serves as a path through which the alkali penetrates, so there is the case where the durability of the catalyst for a long period of time cannot be achieved.

Figure 4:
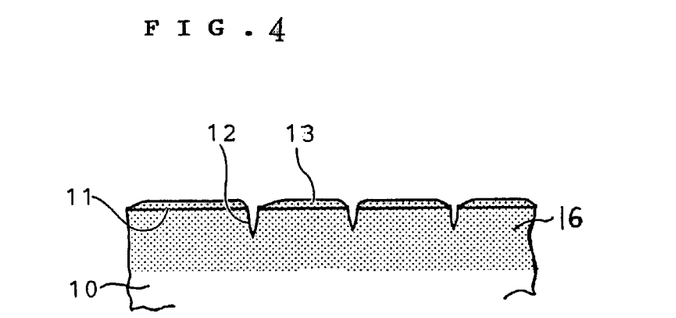
FIG. 4 is a drawing showing the surface of the denitration catalyst coated with a low-concentration dispersion.

FIG. 4 is a drawing showing the surface of the catalyst coated with a low-concentration dispersion.

In FIG. 4, when the low-concentration dispersion is coated on the surface of the catalyst of the denitration catalyst 10, fine particles of the water-repellent component, along with the dispersion medium, penetrate through the catalyst surface 11 and cracks 12 on the surface to the inside of the catalyst, to form the penetration layer 16 in the catalyst. Further, the coating layer 13 is formed on the surface of the catalyst 11, but the coating layer 13 is thin and the amount of the water-repellent component carried is small, so the water-repellent coating layer is not formed in crack 12 on the surface of the catalyst. Accordingly, the sufficient water-repellent effect of the water-repellent coating layer cannot be obtained, and the durability of the denitration catalyst 10 is lowered.

Figure 5:
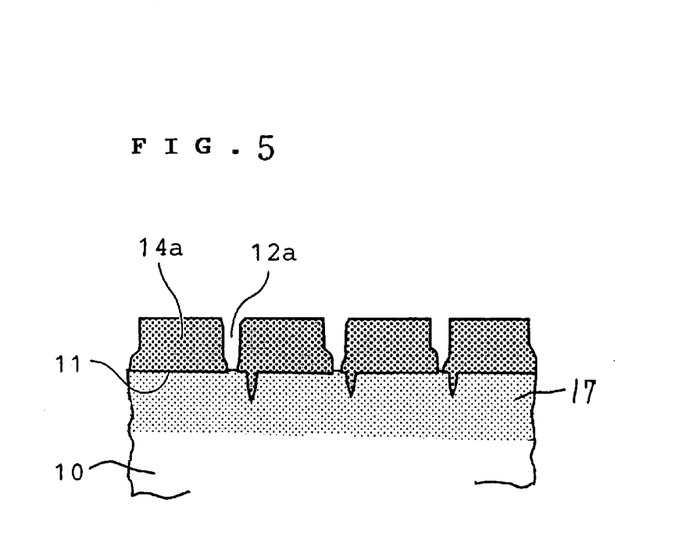
FIG. 5 is a drawing showing the denitration catalyst coated with a high-concentration dispersion.

FIG. 5 is a drawing showing the surface of the catalyst coated with a high-concentration dispersion.

In FIG. 5, when the catalyst surface 11 of the denitration catalyst 10 is coated with a high-conc. dispersion, the penetration layer 17 is formed in the catalyst, and the dispersion medium selectively penetrates into the catalyst to form the thick coating layer 14a on the surface of the catalyst 11, and further the cracks 12 on the surface of the catalyst are filled with the water-repellent component. However, because the coating layer 14a is thick, the diffusion of an exhaust gas into the catalyst is prevented and the denitration activity is decreased. Further, the cracks 12a occur in the coating layer 14a itself, and the cracks 12a serve as paths through which the fluid deliquesced passes, thus decreasing the durability of the denitration catalyst 10.

Figure 6:
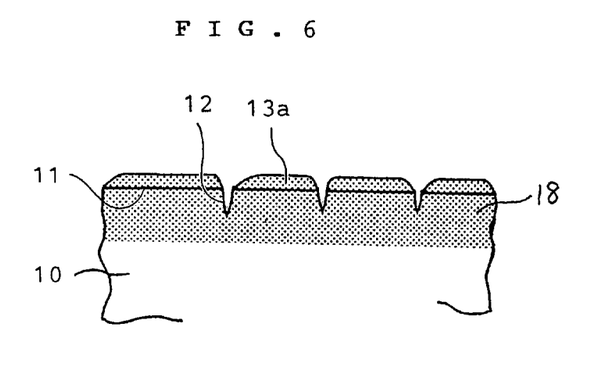
FIG. 6 is a drawing showing the surface of the denitration catalyst coated repeatedly with the low-concentration dispersion.

FIG. 6 is a drawing showing the surface of the catalyst coated repeatedly with a low-concentration dispersion.

In FIG. 6, the surface of the catalyst 11 of the denitration catalyst 10 is coated with a low-concentration dispersion to form a thin water-repellent coating layer, and thereafter, it is further coated with the low-concentration dispersion to form the coating layer 13a. However, even if the catalyst is coated repeatedly with the low-concentration dispersion, the dispersion penetrates through the crack 12 on the surface of the catalyst 11 into the inside of the catalyst to form the high-concentration penetration layer 18 in the catalyst, but the coating layer 13a cannot be formed in the cracks 2 on the surface of the catalyst.

The present invention prevents the occurrence of the problem described above, and it is preferable for improvement of the durability of the catalyst that an aqueous dispersion containing a water-repellent organic resin at a low concentration is coated and dried on the surface of the denitration catalyst used for ammonia reduction of nitrogen oxides contained in an exhaust gas containing deliquescent salts as dust, and then an aqueous suspension containing the water-repellent organic resin at a higher concentration than the above concentration is further coated and dried thereon to form a porous coating layer of the water-repellent organic resin.

Figure 3:
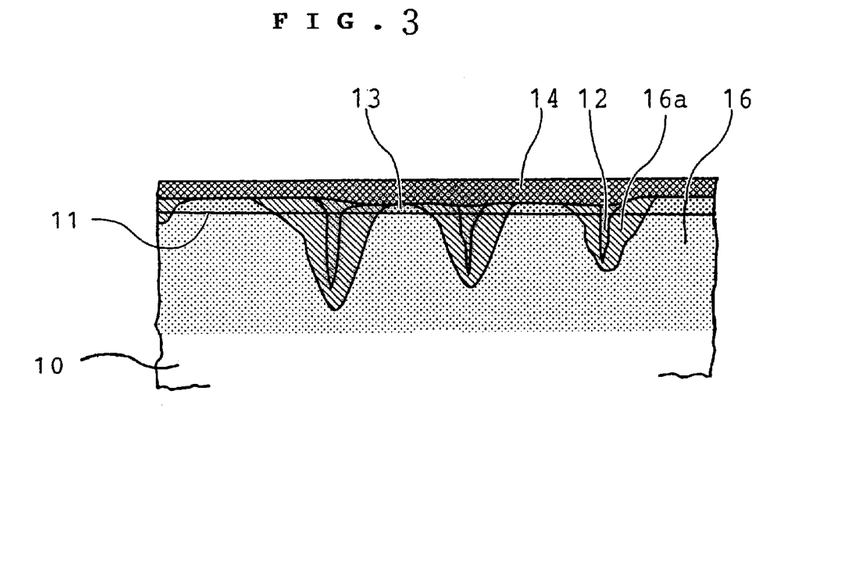
FIG. 3 is a drawing showing the surface of the denitration catalyst according to one example of the present invention.

FIG. 3 is a drawing showing the surface of the denitration catalyst produced by the process described above.

In FIG. 3, a low-concentration dispersion is first coated and dried on the surface of the catalyst 11 of the denitration catalyst 10 to form the thin water-repellent coating layer 13. In this step, the cracks 12 on the surface of the catalyst 11 are not coated with the coating layer 13 (see FIG. 4). Then, the surface of the catalyst on which the coating 13 was formed is coated with a high-concentration dispersion whereby the coating layer 14 is formed. In this step, the dispersion medium for the high-concentration dispersion penetrates through the crack 12 and a thin portion of the coating layer 13 into the catalyst to form the penetration layer 16a, and fine particles of the water-repellent component in the dispersion are accumulated on the coating layer 13 and the crack 12 on which the low-concentration dispersion could not be formed, to form the coating layer 14.

In this manner, after the thin water-repellent coating on the surface of the catalyst is formed from the low-concentration dispersion, then the high-concentration dispersion is coated thereon whereby the selective absorption, into the catalyst, of only the dispersion medium occurring on coating the high-concentration dispersion can be prevented, and the thin coating layer can thereby be formed from the high-concentration dispersion. In this case, it is important to confer water repellence on the surface of the catalyst by coating the surface with the low-concentration dispersion and drying it. By coating the high-concentration dispersion on the water-repellent coating layer, the dispersion medium is absorbed through cracks and thin portions of the initially formed coating layer, and simultaneously the water-repellent component is selectively accumulated on such portions, to form a water-repellent aqueous coating, thus reducing the non-water-repellent portion and forming the uniform and thin coating layer whereby the highly durable catalyst can be obtained.

In the present invention, the water-repellent coating layer can be given by drying the dispersion after coated, or by further calcination at a temperature of 100 to 380° C. after drying. The means for coating the dispersion are not particularly limited, but can be effected by any means known in the art. For example, mention is made of those by means of brush, roller, spray and the like or impregnation of the catalyst with the dispersion.

In the present invention, the denitration catalyst is prepared preferably by forming a composition containing titanium oxide, tungsten oxide or molybdenum oxide, and vanadium oxide into a molded body in the form of plate, honeycomb, particle and the like. In particular, a denitration catalyst of a plate-shaped molded body comprising a composition mainly composed of titanium oxide and molybdenum oxide or tungsten oxide, and vanadium oxide filled between network inorganic fiber substrates and within the nets thereof is preferably used.

The porous coating layer of a water-repellent organic resin is formed preferably by coating or spraying a slurry having fine particles of a water-repellent organic resin selected from fluorine resin, polyamide resin, silicon resin and acrylic resin dispersed in water, or by coating or spraying a slurry having fine particles of the water-repellent organic resin and fine particles of inorganic oxides such as silica, titania dispersed together therein, or a slurry having fine particles of the water-repellent organic resin and catalyst component particles dispersed therein. The term "fine particles" refers not only to spherical fine particles but also to fine fibrous materials such as fibrils. The size of the fine particles is preferably 500 Å or more so as not to penetrate into fine pores in the catalyst to cause clogging of the pores.

In the present invention, the catalyst component particles in the porous coating layer include particles consisting of a mixture of titanium oxide and tungsten oxide or molybdenum oxide, and vanadium oxide. Further, in the present invention, the catalyst component layer on which the coating layer is formed is designed to have a two-layer structure whose surface layer is a vanadium compound-free catalyst component layer to further prevent it from being liable to the toxicity of alkali metal salts.

Formation of the coating layer is conducted usually after calcination of the catalyst, which may be either in a dry state or in a wet state after moistened. In a wet state, there are the advantages that penetration of the water-repellent organic resin into the catalyst pores can be prevented due to water in the catalyst pores and that the amount of the water-repellent organic resin necessary for the coating is reduced. Even if the coating layer is formed on the surface of the catalyst, this coating layer is porous, repels a deliquescence fluid due to its surface tension, and can pass gases such as exhaust gas and vapor through it, so this coating layer does not prevent the denitration reaction.

In the present invention, when a low-concentration dispersion is previously coated to form a porous coating layer, the concentration of a water-repellent organic resin in the dispersion is preferably 5 to 30% by weight, more preferably 10 to 20% by weight for coating properties and from an economical viewpoint. The concentration of the water-repellent organic resin in the high-concentration dispersion subsequently coated is not particularly limited insofar as it is higher than the concentration of the low-concentration dispersion, and its concentration is preferably 30 to 60% by weight for coating properties, coating uniformity and the like. It is preferable to select the concentration suitably depending on coating conditions and water-repellence required of the catalyst surface of the catalyst. Further, the dispersion can contain other components in such a range as not to impair the object of the present invention.

According to the denitration catalyst of the present invention, even if deliquescent salts absorb moisture and deliquesce in the step of temperature raising when a denitration apparatus starts or stops, the porous coating layer of the water-repellent organic resin on the surface repels the salts in a liquid form to prevent them from entering the catalyst whereby the catalyst is prevented from deterioration and the activity thereof can thereby be maintained for a prolonged period of time.

The temperature for use of the catalyst of the present invention subjected to water-repellent treatment is the temperature at which the water-repellent organic resin is not molten or burned; for example, if polytetrafluoroethylene is used as the fluorine resin, 350° C. or less is preferable.

Hereinafter, the present invention is described in more detail by reference to the Examples. In the Examples, "%" means "% by weight" unless otherwise specified.

EXAMPLE 1

2.5 kg of ammonium molybdate (($NH_4$)$_6Mo_7O_{24}$/$4H_2O$)), 2.33 kg of ammonium methavanadate, 3.0 kg of oxalic acid, 4.8 kg of inorganic fibers (trade name: Kaowool) and water were added to 20 kg of titanium oxide powder, and these were kneaded in a kneader to prepare a substrate paste with a water content of 33%.

On the other hand, a network material having 1400 twisted filaments of E glass fibers with a fiber diameter of 9 μm plain-woven at a roughness of 10 filaments/inch was impregnated with a slurry consisting of 40% of titania, 20% of silica sol and 1% of polyvinyl alcohol, and dried at 150° C. to make it rigid to give a catalyst substrate.

The above substrate paste was placed between the two catalyst substrates and passed through a pair of pressure rollers whereby a plate-shaped catalyst of 1.2 mm in thickness consisting of titanium oxide, molybdate oxide, and vanadium oxide was obtained. It was air-dried for 12 hours in the atmosphere and calcined at 500° C. for two hours.

It was subjected to water-repellent treatment by spraying it with fluorine resin aerosol (manufactured by 3M) and drying it at 120° C. for one hour. The amount of this fluorine resin coated, as determined from the increase of the weight, was about 0.5% of the weight of the catalyst.

EXAMPLE 2

2.5 kg of ammonium molybdate (($NH_4$)$_6Mo_7O_{24}$/$4H_2O$)), 2.33 kg of ammonium methavanadate, 3.0 kg of oxalic acid and water were added to 20 kg of titanium oxide powder, and these were kneaded in a kneader to prepare a paste which was then granulated into a tube of 3 mm in diameter. It was then dried in a fluidized-bed dryer, calcined at 550° C. for two hours, and then ground in a hammer mill whereby catalyst powder containing 50% or more of 1 μm or less particles was obtained.

A suspension of a fluorine resin in water (trade name: Polyflon TFE dispersion, produced by Daikin Industries, Ltd.) in an amount of 1% relative to the catalyst was added to 10 kg of catalyst powder and kneaded to give a paste with a water content of 60%.

The resulting paste was coated by a brush on a plate-shaped catalyst prepared in the same manner as in Example 1 and dried to be subjected to water-repellent treatment. The thickness of its water-repellent coating was 0.05 mm.

EXAMPLE 3

Water was added to a fluorine resin suspension (trade name: Polyflon TFE dispersion, produced by Daikin Industries, Ltd.) and kneaded to give a slurry with a water content of 80%.

The plate-shaped catalyst prepared in the same manner as in Example 1 was immersed in the resulting slurry, then deprived of the fluid present, and dried whereby a water-repellent coating layer was formed. The thickness of the water-repellent coating layer was about 0.05 mm.

EXAMPLE 4

The plate-shaped catalyst was subjected to water-repellent treatment in the same manner as in Example 3 except that an acrylic resin emulsion (aqueous acrylic paint, produced by Kampe K. K.) was used in place of the fluorine resin suspension.

The thickness of the water-repellent coating layer thus obtained was about 0.05 mm.

EXAMPLE 5

A catalyst was obtained in the same manner as in Example 1 except that the calcined plate-shaped catalyst while moistened with water was sprayed with the fluorine resin aerosol.

EXAMPLE 6

Water and a fluorine resin suspension (trade name: Polyflon TFE dispersion, produced by Daikin Industries, Ltd.) in an amount of 1% relative to the catalyst were added to 10 kg of fine powder of silicon oxide (trade name: Mycon F, produced by Tomita Seiyaku K. K.), and these were kneaded to give a paste with a water content of 60%. It was coated on a plate-shaped catalyst prepared in the same manner as in Example 2 and dried to be subjected to water-repellent treatment.

Comparative Example 1

A plate-shaped catalyst was obtained in the same manner as in Example 1 except that it was not coated with the water-repellent resin slurry.

Comparative Example 2

In Example 1, water was added to fine powder of silicon oxide (trade name: Mycon F, produced by Tomita Seiyaku K. K.) and kneaded to prepare a slurry with a water content of 60% which was then coated on the surface of a plate-shaped catalyst substrate prepared in the same manner as in Example 2 to give a catalyst.

Test Example 1

The following accelerated-deterioration test, in which each of the plate-shaped catalysts obtained in Examples 1 to 6 and Comparative Examples 1 to 2 was placed for a predetermined period in an alkali salt under conditions causing the salt to deliquesce, was performed to examine the change of the performance of the catalyst with the amount of the alkali adhering to the catalyst.

The plate-shaped catalyst was embedded in a heavy oil burning ash containing 20% sodium sulfate and maintained in saturated steam at 60° C. for 6 hours, assuming the time of stating the boiler. To remove the ash adhered to the surface of the catalyst and the salt deliquesced after the test, the catalyst was dried at 120° C., and thereafter a denitration test was conducted under the conditions in Table 1 to determine the degree of denitration. Further, each catalyst was ground and analyzed for fluorescent X-ray to examine the content of sodium penetrated into the catalyst. The results are collectively shown in Table 2.

TABLE 1

| | |
|---|---|
| NO: | 2000 ppm |
| $CO_2$: | 6 |
| $O_2$: | 10% |
| $H_2O$: | 6% |
| $N_2$: | Balance |
| Gas amount: | 3 L/min |
| Area rate: | 17 m/h |
| Reaction temperature: | 200° C. |

TABLE 2

| | Initial Degree of Denitration (%) | Degree of Denitration after Deterioration Test (%) | Na Content (wt %) |
|---|---|---|---|
| Ex. 1 | 83.5 | 77.2 | 0.1 |
| 2 | 85.5 | 78.3 | 0.2 |
| 3 | 83.2 | 78.3 | 0.1 |
| 4 | 82.5 | 77.0 | 0.1 |
| 5 | 83.6 | 76.8 | 0.2 |
| 6 | 81.5 | 75.9 | 0.1 |
| Com. Ex. 1 | 87.0 | 55.7 | 5.8 |
| 2 | 83.0 | 54.2 | 4.7 |

As is evident from the results in Table 2, the initial activity of the catalysts of the present invention (Examples 1 to 6) was slightly reduced by coating the water-repellent coating layer, but the activity reduction due to the accelerated-deterioration test was low, indicating their superiority in alkali resistance.

Further, the activity of the catalysts in Comparative Examples 1 to 2 after the test was greatly reduced, and a large amount of sodium was detected in the catalysts. To the contrary, the catalysts of the invention did not changed the color of the surface even after the test and sodium was hardly detected in the catalysts. It can be seen that in the catalysts of the invention, the water-repellent coating layer formed on the surface thereof repels sodium sulfate deliquesced, thus preventing it from entering the catalysts thereby preventing the deterioration of the catalysts.

EXAMPLES 7 AND 8

2.5 kg of ammonium molybdate (($NH_4)_6/Mo_7O_{24}/4H_2O$)), 2.33 kg of ammonium methavanadate, 3.0 kg of oxalic acid, and 4.8 kg of inorganic fibers (trade name: Kaowool) and water were added to 20 kg of titanium oxide powder and kneaded in a kneader to prepare a substrate paste with a water content of 33%.

On the other hand, a network material having 1400 twisted filaments of E glass fibers with a fiber diameter of 9 $\mu$m plain-woven at a roughness of 10 fibers/inch was impregnated with a slurry consisting of 40% of titania, 20% of silica sol and 1% of polyvinyl alcohol, and dried at 150° C. to make it rigid to give a catalyst substrate.

The above substrate paste was placed between the two catalyst substrates and passed through a pair of pressure rollers whereby a plate-shaped catalyst of 1.2 mm in thickness consisting of titanium oxide, molybdate oxide, and vanadium oxide was obtained. It was air-dried for 12 hours in the atmosphere and calcined at 500° C. for two hours to give a molded body of the denitration catalyst.

Separately, a fluorine resin dispersion (trade name: Polyflon TFE dispersion, produced by Daikin Industries, Ltd.) was mixed with water to prepare a fluid containing 20% of fluorine resin, and the resulting fluid was coated by a brush on the surface of the above molded body of the denitration catalyst and dried at 120° C. for one hour whereby a primary coating layer was formed. Thereafter, the fluorine resin dispersion and water were mixed to prepare a fluid containing 60% of fluorine resin (Example 7) and a fluid containing 50% of fluorine resin (Example 8) respectively, and these fluids were coated respectively by a brush on the surface of the denitration catalyst having the primary coating formed thereon, and then dried at 120° C. for one hour and calcined at 250° C. for one hour. The total amounts of the fluorine resin coated, as determined from the increase of the weight, were 150 g/m² and 140 g/m² respectively.

EXAMPLE 9

Water-repellent treatment was conducted in the same manner as in Example 7 except that after the primary coating layer was formed, it was dried at 120° C. for one hour and then calcined at 250° C. for one hour. The amount of this fluorine resin coated was 150 g/m².

EXAMPLE 10

The molded body of the denitration catalyst obtained in Example 7 was immersed in a fluid containing 20% of fluorine resin prepared by mixing a fluorine resin dispersion (trade name: Polyflon TFE dispersion, produced by Daikin Industries, Ltd.) with water, then deprived of the fluid present, and dried whereby a water-repellent primary coating layer was formed. Thereafter, the catalyst having the primary coating layer formed thereon was immersed in a fluid containing 50% of fluorine resin prepared by mixing the fluorine resin dispersion with water, then deprived of the fluid present, and calcined at 250° C. for one hour to give a catalyst. The amount of the fluorine resin coated in this case was 160 g/m².

Comparative Example 3

A fluid containing 30% of fluorine resin prepared by mixing a fluorine resin suspension (trade name: Polyflon TFE dispersion, produced by Daikin Industries, Ltd.) with water was coated by a brush on the surface of a molded body of a denitration catalyst prepared in the same manner as in Example 7, then dried and calcined at 250° C. for one hour to give a catalyst. The amount of the fluorine resin coated in this case was 70 g/m². This comparative example corresponds to FIG. 4.

Comparative Example 4

A fluorine resin dispersion (Polyflon TFE dispersion, produced by Daikin Industries, Ltd.) stock solution (containing 60% fluorine resin) was coated by a brush on the surface of a molded body of a denitration catalyst prepared in the same manner as in Example 7, then dried and calcined at 250° C. for 1 hour to give a catalyst. The amount of the fluorine resin coated in this case was 150 g/m². This comparative example corresponds to FIG. 5.

Comparative Example 5

A fluid containing 30% fluorine resin prepared by mixing a fluorine resin suspension (trade name: Polyflon TFE dispersion, produced by Daikin Industries, Ltd.) with water was coated by a brush on the surface of a molded body of a denitration catalyst prepared in the same manner as in Example 1 and dried whereby a water-repellent primary coating was formed. Thereafter, the same fluid containing 30% of fluorine resin was coated by a brush on the surface of the catalyst having a primary coating formed thereon, then dried and calcined at 250° C. for 1 hour to give a catalyst. The amount of the fluorine resin coated in this case was 150 g/m². This comparative example corresponds to FIG. 6.

Comparative Example 6

A plate-shaped catalyst was obtained without coating the water-repellent resin dispersion in Example 7.

Test Example 2

An accelerated-deterioration test, in which each of the catalysts obtained in Examples 7 to 10 and Comparative Examples 3 to 6 was placed for a predetermined period in an alkali salt under conditions causing the salt to deliquesce, was performed to examine the change of the performance of the catalyst. That is, the catalyst was embedded in heavy oil burning ash containing 20% of sodium sulfate and maintained in saturated steam at 60° C. for 6 hours, assuming the time of starting the boiler.

To remove the ash adhered to the surface of the catalyst and the salt deliquesced after the test, the catalyst was dried at 120° C. to remove the precipitates, and the degrees of denitration were determined under the conditions in Table 1 and the results are shown in Table 3.

TABLE 3

|  | First/second Concentrations in Dispersion (%) | Coated Amount (g/m2) | Initial Degree of Denitration (%) | Degree of Denitration After Deterioration Test (%) |
|---|---|---|---|---|
| Ex. 7 | 20/60 | 150 | 82.0 | 81.2 |
| 8 | 20/50 | 140 | 81.5 | 80.3 |
| 9 | 20/60 | 150 | 81.2 | 81.3 |
| 10 | 20/50 | 160 | 82.5 | 80.9 |
| Com. Ex. 3 | 30 | 70 | 85.0 | 70.7 |
| 4 | 60 | 150 | 78.0 | 77.2 |
| 5 | 30/30 | 150 | 82.2 | 72.5 |
| 6 | — | — | 87.0 | 65.7 |

From Table 3, the denitration catalysts of the present invention (Examples 7 to 10) show a less decrease in the degrees of denitration of the accelerated-deterioration test, indicating their superiority to durability in use for a long period of time.

To the contrary, in Comparative Example 3 where the thin fluid was coated once, the degree of denitration before the accelerated-deterioration test was high but was greatly reduced after the accelerated-deterioration test. Further, in Comparative Example 4 where the thick fluid was coated once, the degree of denitration was less changed before and after the accelerated-deterioration test, but was lower than in Comparative Example 6 where the water-repellent treatment was not conducted. Further, even in Comparative Example 5 where the thin fluid was coated twice, the degree of denitration was greatly reduced after the accelerated-deterioration test. In Comparative Example 6, the water-repellent treatment was not conducted, so the degree of denitration was high before the accelerated-deterioration test, but was considerably reduced after the accelerated-deterioration test.

Industrial Applicability

The denitration catalyst of the present invention, even when used in the treatment of an exhaust gas containing ash containing highly deliquescent salts, enables the water-repellent porous coating layer formed on the surface to prevent the salts having deliquesced from entering the catalyst, thus preventing the deterioration of the catalyst and enables a high catalytic activity to be maintained for a long period of time.

In particular, the denitration catalyst obtained by coating the surface of the denitration catalyst with a low-concentration dispersion, drying the coating, further coating a high-concentration dispersion, and drying the coating bears on the surface thereof a uniform, dense and thin water-repellent porous coating layer, thus enabling significant improvement of the durability of the denitration catalyst.

Effective denitration of nitrogen oxides (NOx) in an exhaust gas containing ash with deliquescent salts, such as in an oil-fired boiler exhaust gas, an exhaust gas from a boiler using wood chips and peat as fuels and a furnace exhaust gas can thereby be made feasible, so the industrial and social worth of the present invention is significantly high.

What is claimed is:

1. A denitration catalyst for use in the reduction, with ammonia, of nitrogen oxides contained in an exhaust gas containing deliquescent salts as dust, which bears on the surface of the denitration catalyst a porous coating layer of a mixture of a water-repellent organic resin with inorganic oxide particles, or a porous coating layer of a mixture of a water-repellent organic resin with catalyst component particles.

2. A denitration catalyst according to claim 1, wherein the water-repellent organic resin is a resin selected from the group consisting of flourine resin, polyamide resin, acrylic resin and silicon resin.

3. A denitration catalyst according to claim 1, wherein the catalyst component comprises titanium oxide, either molybdenum oxide or tungsten oxide, and vanadium oxide.

4. A denitration catalyst according to claim 3, wherein the denitration catalyst is a plate-shaped molded body comprising a composition of titanium oxides, either molybdenum oxide or tungsten oxide, and vanadium oxide, filled within network inorganic fiber substrates.

5. A denitration catalyst according to claim 1, wherein the denitration catalyst is a catalyst molded body containing, titanium oxide, either molybdenum oxide or tungsten oxide, and vanadium oxide.

6. A denitration catalyst according to claim 2, wherein the catalyst component comprises titanium oxide, either molybdenum oxide or tungsten oxide, and vanadium oxide.

7. A process for preparing a denitration catalyst, which comprises permitting an aqueous slurry or emulsion of at least one resin composition selected from the group consisting of a mixture of the water-repellent organic resin and inorganic oxide particles, and a mixture of the water-repellent organic resin and catalyst component particles to be coated on, or to adhere by a spray to the surface of a denitration catalyst and then evaporating its water to form a porous coating layer.

8. A process for preparing a denitration catalyst according to claim 7, wherein the denitration catalyst is a catalyst molded body comprising a composition of titanium oxide, either molybdenum oxide or tungsten oxide, and vanadium oxide, and the catalyst molded body is previously moistened to form the porous coating layer in a wet state.

9. A process for preparing a denitration catalyst, which comprises coating an aqueous dispersion containing a water-repellent organic resin at a low concentration onto the surface of a denitration catalyst for use in the ammonia reduction of nitrogen oxides contained in an exhaust gas containing highly deliquescent salts as dust, drying the coating, further coating the dried coating with an aqueous dispersion containing a water-repellent organic resin at a higher concentration than the above concentration, and then drying the coating to form a porous coating layer of the water-repellent organic resin.

10. A process for preparing a denitration catalyst according to claim 9, wherein the concentration of the water-repellent organic resin in the low-concentration aqueous dispersion ranges from 5 to 30% by weight.

11. A process for preparing a denitration catalyst according to claim 10, wherein the water-repellent organic resin is a resin selected from the group consisting of flourine resin, polyamide resin, acrylic resin and silicon resin.

12. A process for preparing a denitration catalyst according to claim 10, wherein the denitration catalyst is a catalyst molded body comprising a composition of titanium oxide, either molybdenum oxide or tungsten oxide, and vanadium oxide.

13. A process for preparing a denitration catalyst according to claim 9, wherein the concentration of the water-repellent organic resin in the low-concentration aqueous dispersion ranges from 10 to 20% by weight.

14. A process for preparing a denitration catalyst according to claim 9, wherein the concentration of the water-repellent organic resin in the high-concentration aqueous dispersion ranges from 30 to 60% by weight.

15. A process for preparing a denitration catalyst according to claim 9, wherein the water-repellent organic resin is a resin selected from the group consisting of flourine resin, polyamide resin, acrylic resin and silicon resin.

16. A process for preparing a denitration catalyst according to claim 9, wherein the denitration catalyst is a catalyst molded body comprising a composition of titanium oxide, either molybdenum oxide or tungsten oxide, and vanadium oxide.

17. A denitration catalyst according to claim 9, wherein the denitration catalyst is a plate-shaped molded body comprising a composition of titanium oxide, either molybdenum oxide or tungsten oxide, and vanadium oxide, filled between network inorganic fiber substrates.

18. A denitration catalyst prepared by a process according to claim 9.

* * * * *